(12) United States Patent
Dragone

(10) Patent No.: US 6,456,752 B1
(45) Date of Patent: Sep. 24, 2002

(54) LARGE N×N OPTICAL SWITCH USING BINARY TREES

(75) Inventor: Corrado P. Dragone, Little Silver, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 53 days.

(21) Appl. No.: 09/687,346

(22) Filed: Oct. 13, 2000

(51) Int. Cl.[7] .................................................. G02B 6/26
(52) U.S. Cl. .......................................... 385/17; 385/24
(58) Field of Search ............................... 385/16, 17, 24

(56) References Cited

U.S. PATENT DOCUMENTS

| | | | | |
|---|---|---|---|---|
| 6,151,431 A | * | 11/2000 | White | 385/16 |
| 6,292,597 B1 | * | 9/2001 | Lagali et al. | 385/1 |
| 6,370,295 B2 | * | 4/2002 | Lebouette et al. | 385/16 |

* cited by examiner

*Primary Examiner*—Hung N. Ngo
(74) *Attorney, Agent, or Firm*—John Caccuro

(57) ABSTRACT

A dilated N×N optical cross-connect switch suitable for large N exhibits good efficiency (element count) without a significant increase in and reduced small depth (low loss) and crosstalk. The present arrangement consists of six levels of binary trees of 1×2 and 2×1 elements. The first two levels form the input stage, the third and fourth levels form the center stage, and the fifth and sixth levels form the output stage. In each of the input, center, and output stages, the odd number level is formed as a binary tree of 1×2 elements and the even numbered level is formed as a binary tree of 2×1 elements. Each stage is formed by directly joining together the 1×2 element binary tree with the 2×1 element binary tree. In one embodiment, depth is substantially reduced by using a symmetric arrangement of one or more 2×2 elements located in the vicinity of each junction between adjacent stages. The arrangement also features reduced depth obtained by a Clos type construction.

15 Claims, 17 Drawing Sheets m=2

311 m=3

312 m=4

313

LARGE N×N OPTICAL SWITCH USING BINARY TREES

CROSS-REFERENCE TO RELATED APPLICATIONS

Related subject matter is disclosed in my previously filed application entitled "N×N CROSSCONNECT SWITCH USING WAVELENGTH ROUTERS AND SPACE SWITCHES," Ser. No. 09/653,449, filed on Aug. 31, 2000 and assigned to the same assignee.

TECHNICAL FIELD OF THE INVENTION

The present invention relates to optical crossconnect switches and, more particularly, to a large N×N arrangement of binary trees suitable for optical crossconnect switches.

BACKGROUND OF THE INVENTION

In high capacity optical networks, an essential device is the N×N crossconnect switch. The function of this device is to provide at each node full connectivity among several incoming fibers, each carrying several wavelength channels. The switch must be nonblocking [1-11], and it must be fast and efficient. (Note in this specification, a reference to another document is designated by a number in brackets to identify its location in a list of references found in the Appendix.) These properties can be realized with minimal loss and crosstalk by using the classical crossbar construction, consisting of binary trees of 1×2 and 2×1 elements [2]. However this arrangement becomes impractical for large N, because of its large number of elements given by 2N (N×1). Because the number of elements increases quadratically with N, the N×N crossconnect switch rapidly becomes too large for large N. For example, the number of elements for N=64 and 128 are, respectively, 8064 and 32512. With the ever-increasing capacity of optical networks there is continuing need for even larger N×N crossconnect switches.

What is desired is a large N×N crossconnect switch that minimizes the number of elements without a significant increase in loss and crosstalk.

SUMMARY OF THE INVENTION

In accordance with the apparatus of the present invention, a dilated N×N optical cross-connect switch suitable for large N is disclosed which exhibits good efficiency (small element count) realized with low values of depth (low loss) and crosstalk. As compared to the classical crossbar switch arrangement, both width and element count are substantially reduced, without substantially increasing depth and crosstalk. The present arrangement can be realized, in its simplest form, by using six levels of binary trees of 1×2 and 2×1 switching elements. The first two levels form the input stage, the third and fourth levels form the center stage, and the fifth and sixth levels form the output stage. In each of the input, center, and output stages, the odd number level is formed as a binary tree of 1×2 elements and the even numbered level is formed as a binary tree of 2×1 elements. Each stage is formed by directly joining together the 1×2 element binary tree with the 2×1 element binary tree. Similarly, adjacent stages are joined together by directly connecting together pairs of trees. In one embodiment, depth is substantially reduced by using a symmetric arrangement of one or more 2×2 elements located in the vicinity of each junction between adjacent stages. Using the present arrangement, the number of elements needed for a N×N cross-connect, where N=64, 128 is, respectively, approximately 4500, 13500, as compared to about 8000, 33000 required using two stages of binary trees as in the classical crossbar arrangement. The arrangement also features reduced depth obtained by a Clos type construction. Crosstalk is of order two, and it causes a maximum of three components transmitted to each output port.

More particularly, my invention is directed to an N×N nonblocking optical switch for providing a connection between any of N inlets and any of N outlets, where N is an integer, the N×N switch comprising (1) an integer number p of layers, each formed by a distinct N×N arrangement; (2) an integer number N of 1×p input space switches, each input of each of the N input space switches connects to a different one of the N inlets, and each input space switch connects to all layers; (3) an integer number N of p×1 output space switches, each output of each of the N output space switches connects to a different one of the N outlets, and each output space switch connects to all layers; (4) where each layer consists of three stages, the first and third of which consist of m×m switches and the second stage consists of $$\frac{N}{m^2} \times \frac{N}{m^2}$$

nonblocking switches; (5) where each m×m switch is capable of forming at least one path from any of its m input ports to any of its m output ports, and each m×m of the first stage is connected to each m×m switch of the third stage via one particular switch of the second stage; and (6) where the number p of layers satisfies $p \geq 2m-1$.

According to another aspect of my invention, an N×N nonblocking optical switch provides a connection between any of N inlets and any of N outlets, where N is an integer, the N×N switch comprising, in its simplest form, three stages respectively consisting of m×p, $$\frac{N}{m} \times \frac{M}{m},$$

and p×m switches, where m is an integer divisor of N an p is an integer satisfying $p \geq 2m-1$. Each stage consists of two levels of trees, and the complete arrangement comprises, (1) six levels of trees formed by 1×2 or 2×1 switching elements arranged in an input stage, a center stage and an output stage; (2) where each even level of trees is formed by 1×2 elements, so that each tree has one input port, which is formed by the 1×2 element at the root of the tree, and it has many output ports formed by the output 1×2 elements corresponding to the leaves of the tree; (3) where each odd level of trees is formed by 2×1 elements, so that each trees is reversed, thus having one output port corresponding to the root and many input ports corresponding to the leaves. The input stage consisting of m×p switches including a first level and a second level of binary trees, each tree of the first level having its input port connected to a different one of the N inlets and having each output port connected to a different tree of the second level of trees, each output port of the second level of trees being connected to a different tree of the center stage. The center stage consisting of $$\frac{N}{m} \times \frac{M}{m}$$

switches, including a third level and a fourth level of binary trees, each tree of the third level having each output port connected to a different tree of the fourth level of trees, each output port of the fourth level of trees being connected to a different tree of the output stage. The output stage consisting of p×m switches including a fifth level and a sixth level of binary trees, each tree of the fifth level having each output port connected to a different tree of the sixth level of trees, each output port of the sixth level of trees being connected to a different one of the N outlets.

An important feature of the above arrangement is that consecutive stages are joined together by directly connecting together the roots of the trees on either side of the junction. As a consequence, both depth and number of elements can be reduced by replacing the 1×2 and 2×1 elements close to the junction with a smaller number of 2×2 elements.

arrangement consisting of a central stage of $$\frac{N}{m^2} \times \frac{N}{m^2}$$

blocks connected between input and output stages of binary trees.

Figure 12:
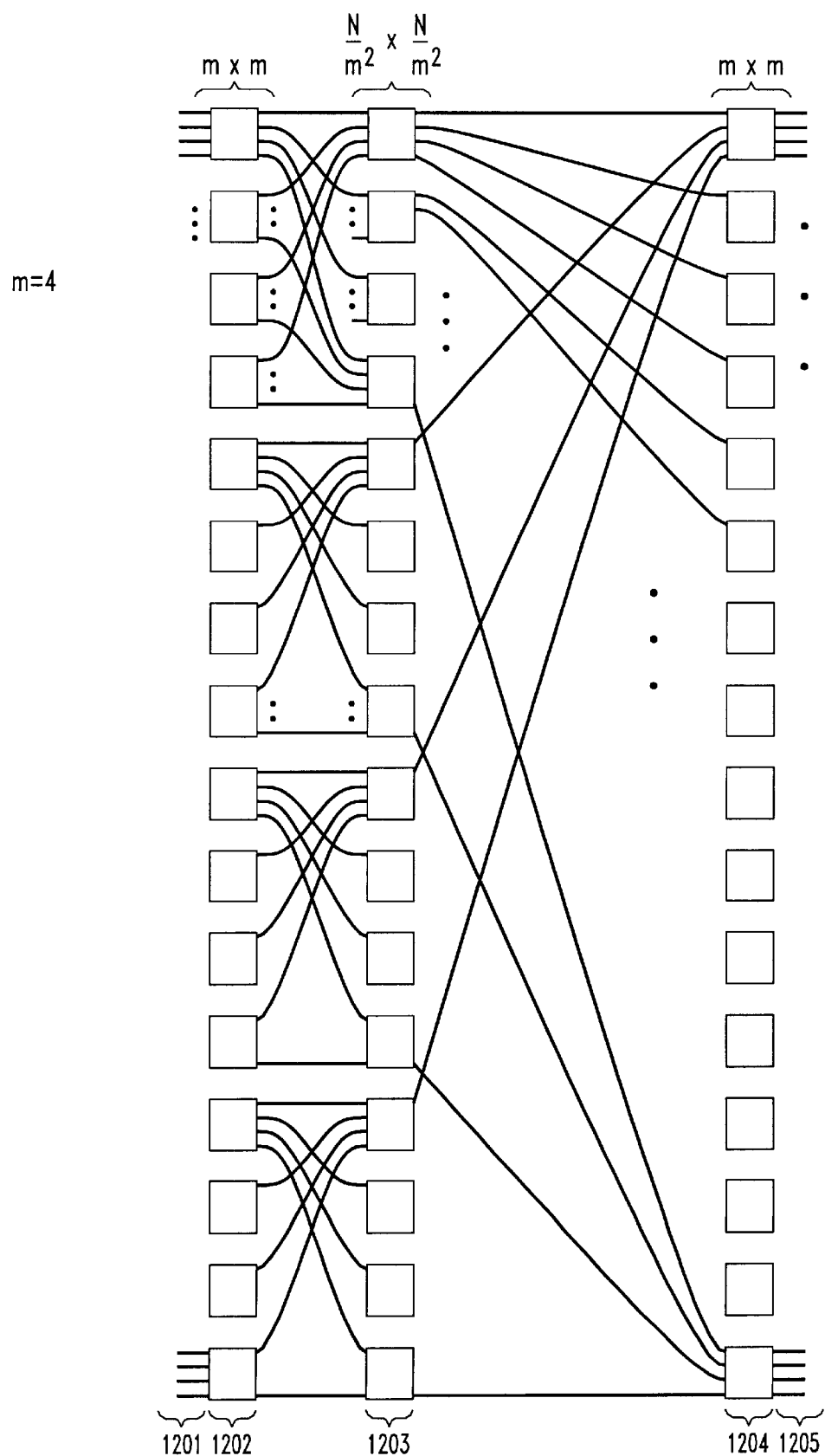

FIG. 12 shows a blocking N×N arrangement consisting of a central stage of $$\frac{N}{m^2} \times \frac{N}{m^2}$$

blocks connected between input and output stages of m×m switches.

Figure 13:
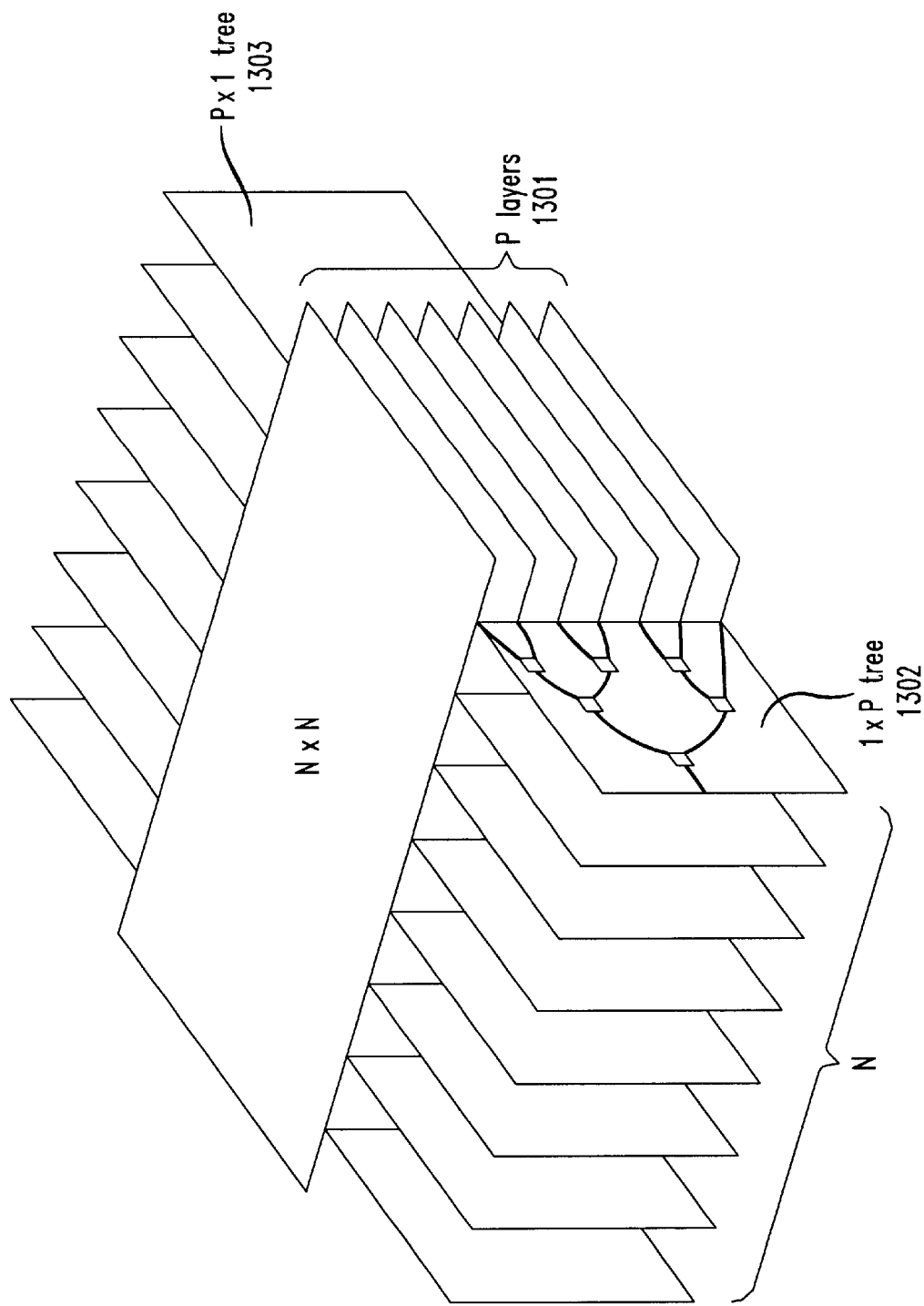

FIG. 13 shows a nonblocking N×N arrangement realized using p layers, each realized using the blocking arrangement of FIG. 12.

Figure 9:
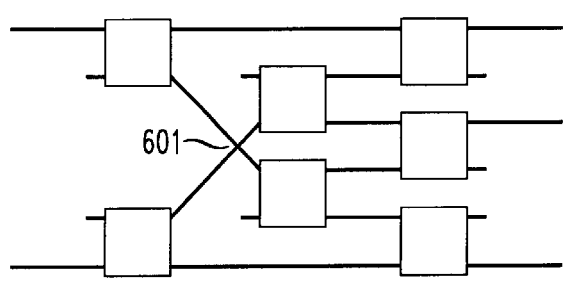
FIG. 9 shows an optimized 2×3 crossbar arrangements suitable for realization in integrated form on a wafer with only one waveguide crossing.
Figure 14A:
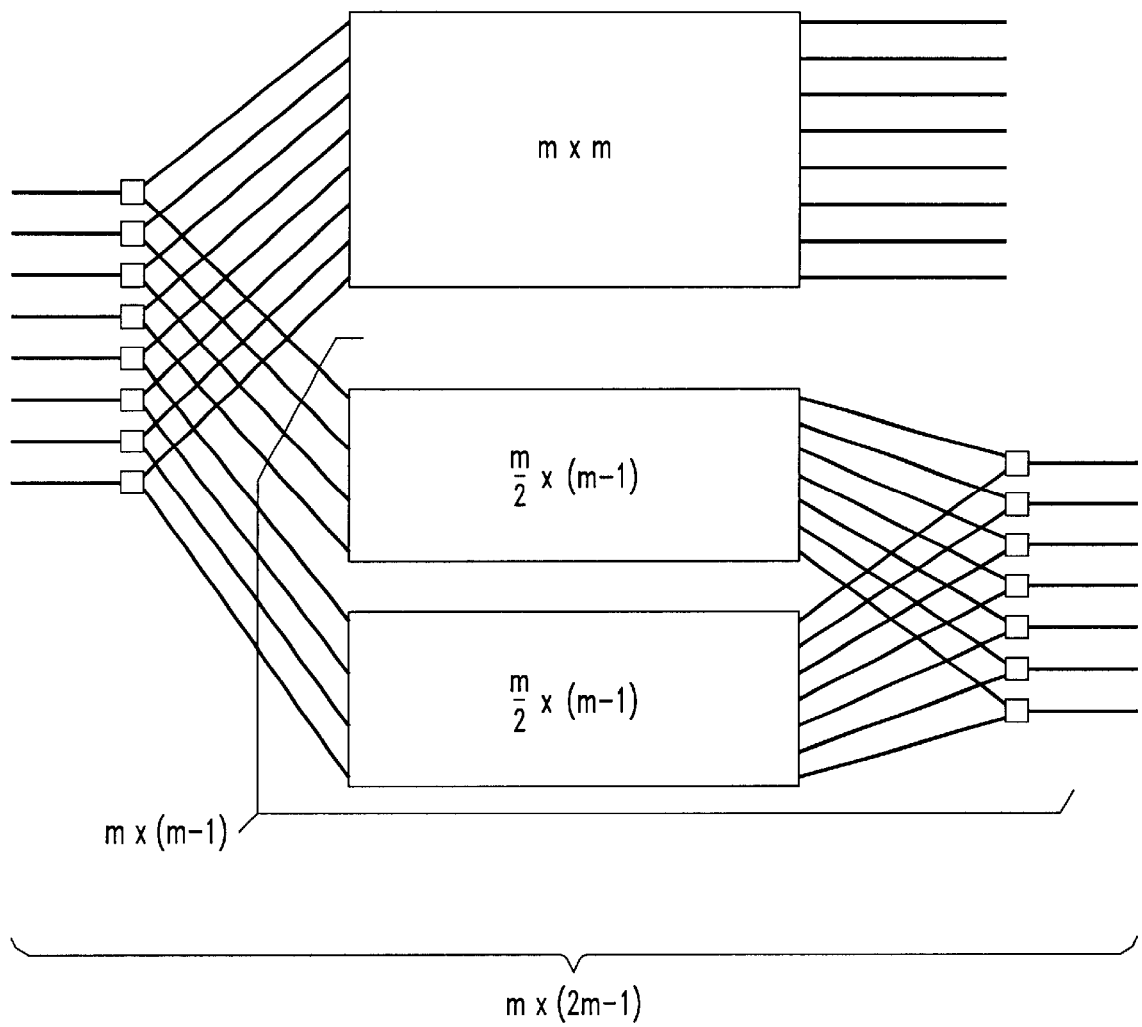
Figure 14B:
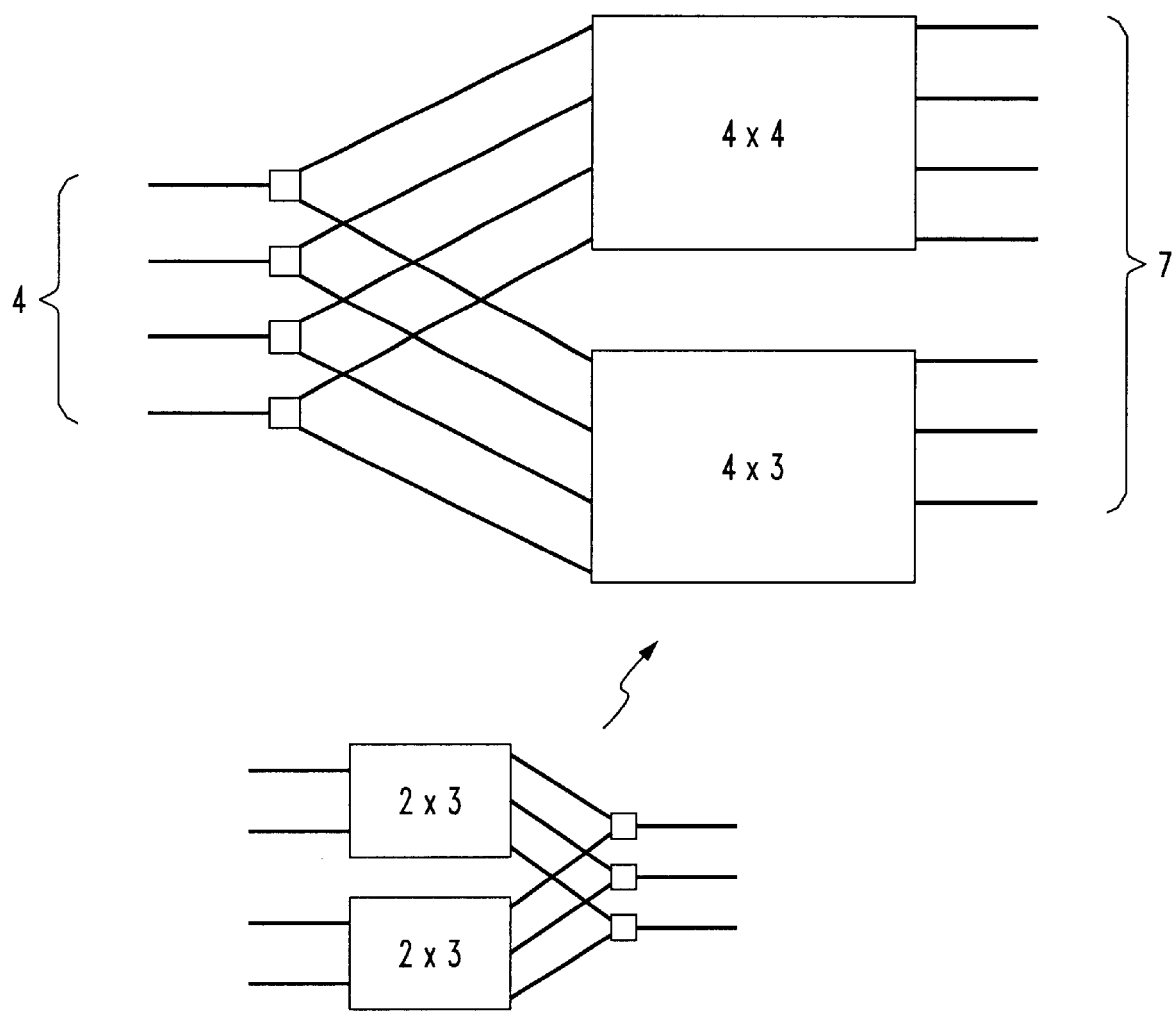
Figure 14C:
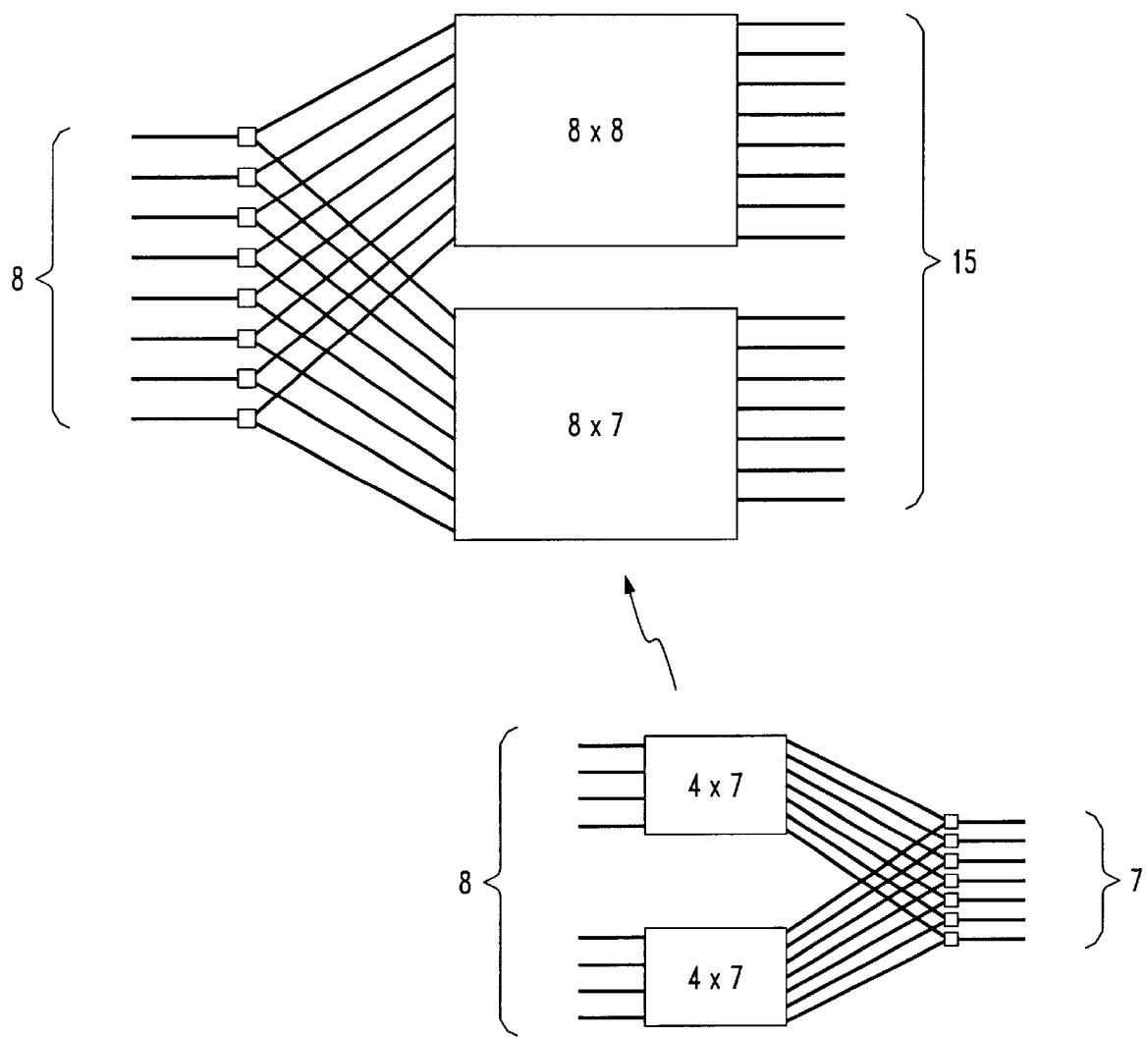

FIG. 14a shows a crossbar construction of a m×(2m−1) unit using smaller building blocks. By using recursively this construction a m×(2m×1) arrangement is realized as a combination of symmetric m×m blocks and asymmetric m/2×(m−1) blocks, as shown for instance in FIGS. 14b and 14c for m=4 and 8, respectively. In each case, using the arrangement of FIG. 9. waveguide crossings are minimized.

In the following description, identical element designations in different figures represent identical elements. Additionally in the element designations, the first digit refers to the figure in which that element is first located (e.g., 102 is first located in FIG. 1).

DETAILED DESCRIPTION

In accordance with the apparatus of the present invention, a dilated N×N optical cross-connect suitable for large N is disclosed which exhibits good efficiency (small element count) realized with low values of depth (low loss) and crosstalk. As compared to the classical crossbar switch arrangement, both width and element count are substantially reduced, without substantially increasing depth and crosstalk. In the simplest case the arrangement is realized by using three stages, with each stage consisting of two levels of binary trees of 1×2 and 2×1 switching elements. An important feature of the arrangement is that consecutive stages are joined together by directly connecting together the roots of the trees on either side of the junction. As a consequence, the total depth can be substantially reduced by replacing the 1×2 and 2×1 elements close to the junction with a smaller number of 2×2 elements. On the other hand this technique increases the number of links between stages and therefore it is primarily useful when stringent requirements are imposed on depth (loss). In all cases the new arrangements are characterized by low values of crosstalk and depth similar to those of the classical crossbar arrangement. In particular, crosstalk is of order two, and it essentially causes at most three components transmitted to each output port.

Figure 1:
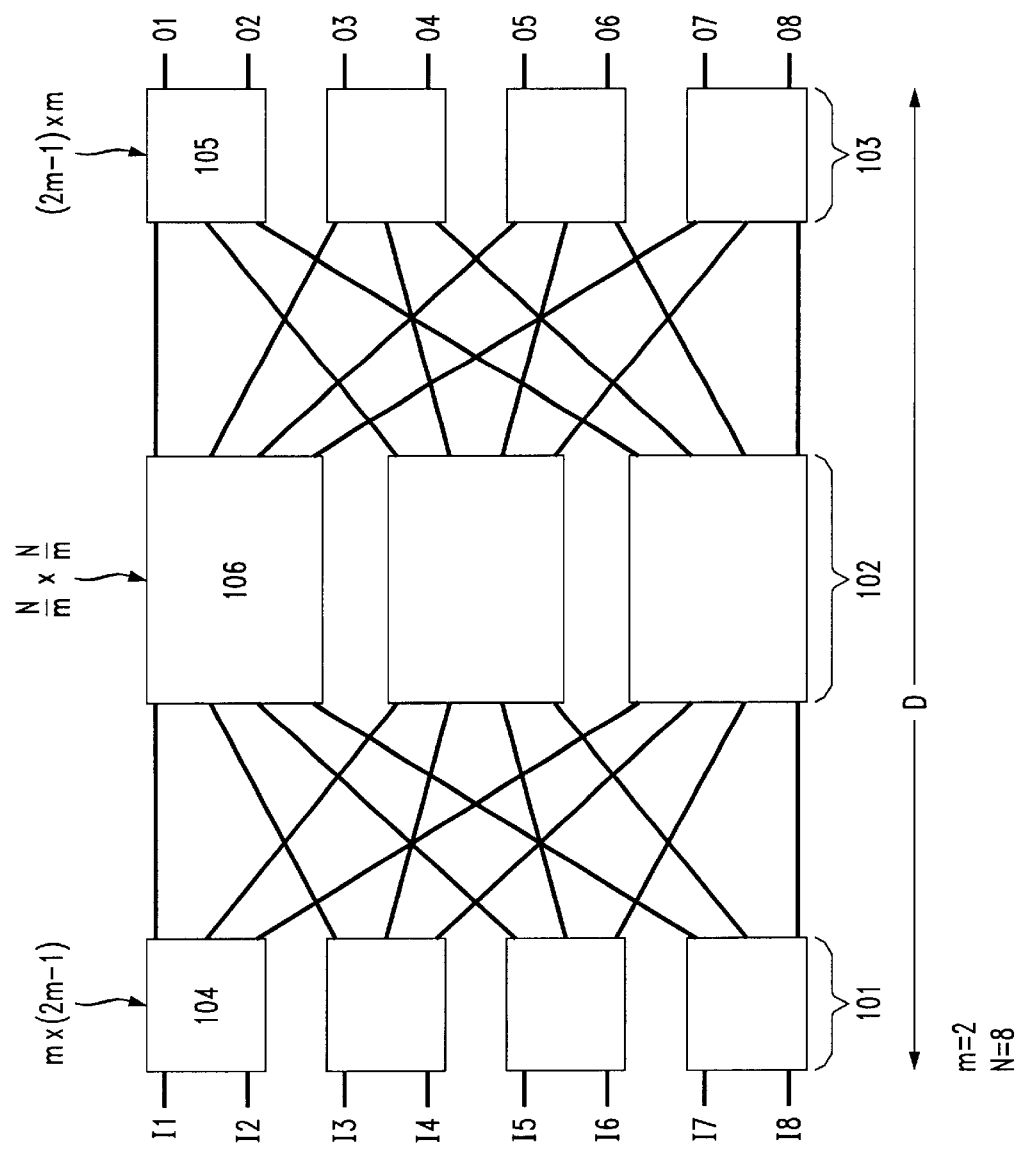
FIG. 1 shows a block diagram of an N×N cross-connect switch realized using Clos arrangement. The building blocks in the center stage are n×n switches with n=N/M and, in the other two stages, m×(2m−1) and (2m−1)×m switches.
Figure 2A:
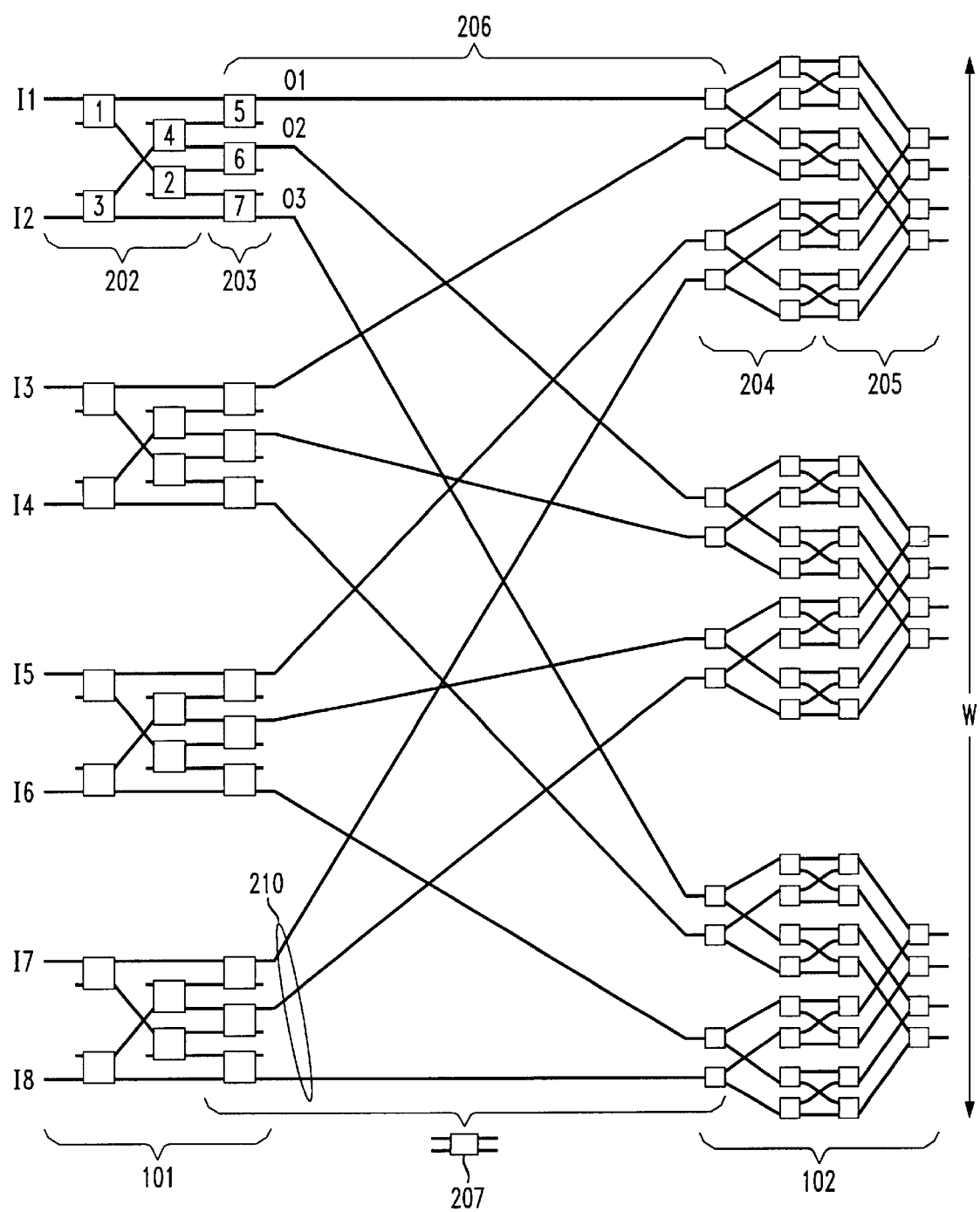
FIG. 2a shows that at the junction of two stages each 2×1 element of the first stage is connected to a 1×2 element of the other stage. These two elements can be replaced by a single 2×2 element as shown in FIG. 2b at the expense of doubling the number of links between the two stages.

Shown in FIG. 1 is a block diagram of an N×N cross-connect switch realized using Clos arrangement. The building blocks in the center (or second) stage 102 are n×n switches with n=N/m and, in the input (or first) 101 and output (or third) 103 stages, m×(2m−1) and (2m−1)×m switches are used, respectively. As shown in FIG. 2a for m=2, the building blocks of each stage 101–103 are constructed by using a crossbar arrangement of binary trees. For example, block 201 of the first stage includes a first level 202 having a separate input binary tree for each of the inputs I1 and I2 and a second level 203 having a separate output binary tree for each of the outputs O1, O2, and O3. The input I1 binary tree includes the 1×2 elements 1 and 2 while the input I2 binary tree includes the 1×2 elements 3 and 4. The output O1 tree includes the 2×1 element 5, while output O2 tree includes the 2×1 element 6, and output O3 tree includes the 2×1 element 6. The second stage 102 has a first level 204 and a second level 205 as does the third stage (not shown). Thus, the N×N cross-connect switch of FIG. 1 is realized using a total of six levels of binary trees, where each of the first, second and third stages includes two levels of binary trees. The first of these two levels is formed of 1×2 elements (e.g., 202, 204 of FIG. 2*a*) and the second is formed of 2×1 elements (e.g., 203 and 205 of FIG. 2*a*). Connecting together corresponding elements at the junction 206 of the two stages then joins consecutive stages. This is shown in FIG. 2*a*, where at the junction 206 the columns of 2×1 elements of the first stage 101 are paired to corresponding 1×2 elements of the second stage 102. Along the junction 206, each pair of 2×1 and 1×2 elements are replaced with a single 2×2 element, e.g., 207, to obtain a single column of 2×2 elements a shown in FIG. 2*b*. Although not shown in FIG. 2*b*, the same procedure is repeated at the junction between the second (center) 102 and third (output) stages 103 of the N×N switch of FIG. 1. When the junctions are connected in this manner, the resulting N×N switch has a total depth (loss) that is reduced by two without substantially affecting crosstalk. Often one would like to realize each building block in integrated form on a planar wafer with minimum waveguide crossings. Then the optimum arrangement for the input 101 and output 103 stages is obtained by properly arranging the various trees as shown later. Finally, we also determine the optimum size of the input and output switches (104 and 105 of FIG. 1) that minimize the total element count. The final result is an N×N switch arrangement with the following properties. First, both element count and width are appreciably lower than those of the classical crossbar arrangement. Indeed they are not substantially larger than the minimum values, for a fully dilated nonblocking switch. Second, crosstalk and depth are reasonably close to those of the crossbar arrangement. Third, the result is optimal, in the sense that crosstalk and depth cannot be further reduced without significantly increasing width and element count.

Figure 3A:
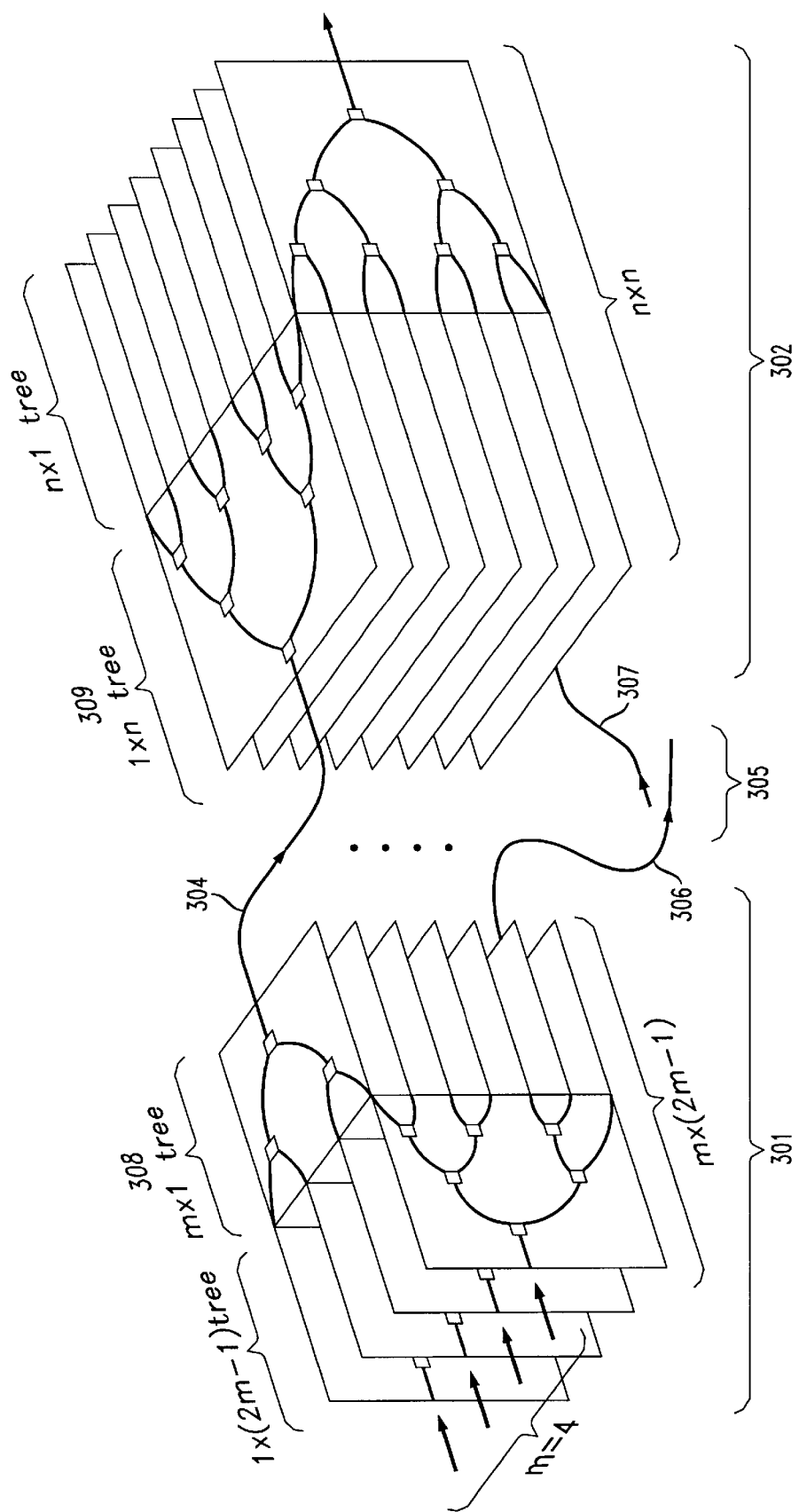
FIG. 3a shows a three dimensional view of two crossbar arrangements connected by a link.

In the above example we have considered the simplest case m=2, but the same results are obtained for larger m. We realize each building block by using a crossbar arrangement, and obtain six levels of binary trees. With reference to FIG. 3*a*, there is shown a building block 301 of a first stage and a building block 302 of a second stage of a switch arrangement where N=32, m=4. The first and second levels form the first stage, and they are respectively made up of 1×(2m−1) and m×1 trees. The third and fourth levels form the second stage, and they are made up of 1×n and n×1 trees. Similarly, the last stage is simply the mirror image of the first stage. Notice each connection between the first and second stage is realized by a link 304 that directly connects together the roots of two trees located on opposite sides of the junction 305. Thus as shown in FIG. 3*a*, each m×1 tree is connected to a 1×n tree over a different a link 304. Note that the seventh or last m×1 tree of block 301 of the first stage connects over link 306 to the first 1×n tree of the seventh block, not shown, of the second stage. Note that the eighth 1×n tree of the first block 302 of the center stage would connect over link 307 to the first m×1 tree of the eighth block, not shown, of the first stage. This is because in our illustrative switch arrangement N=and m=4, hence the first stage includes N/m (i.e., 8) blocks, each with 2m−1 or 7 outputs, and the second stage includes 2m−1 blocks (i.e., 7), each with N/m or 8 inputs.

Figure 3B:
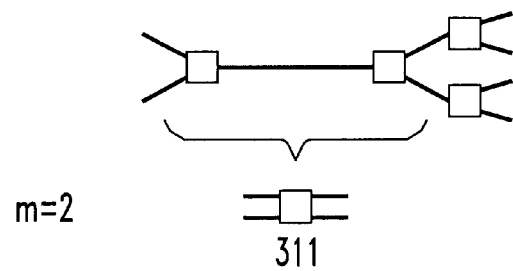
FIG. 3b shows how interconnections between binary trees can be replaced by a simple m×m element, where illustratively m=2, 3, and 4.
Figure 3B:
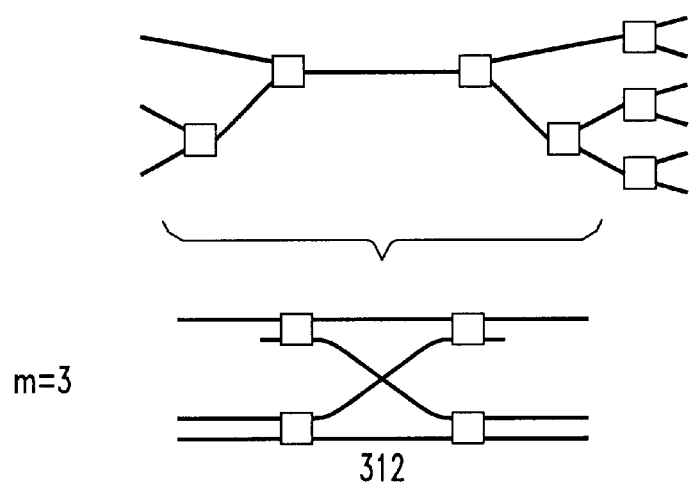
Figure 3B:
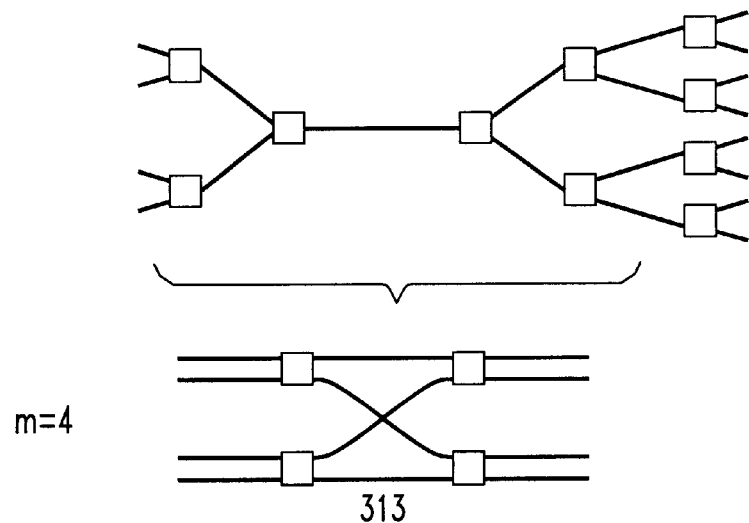
Figure 4:
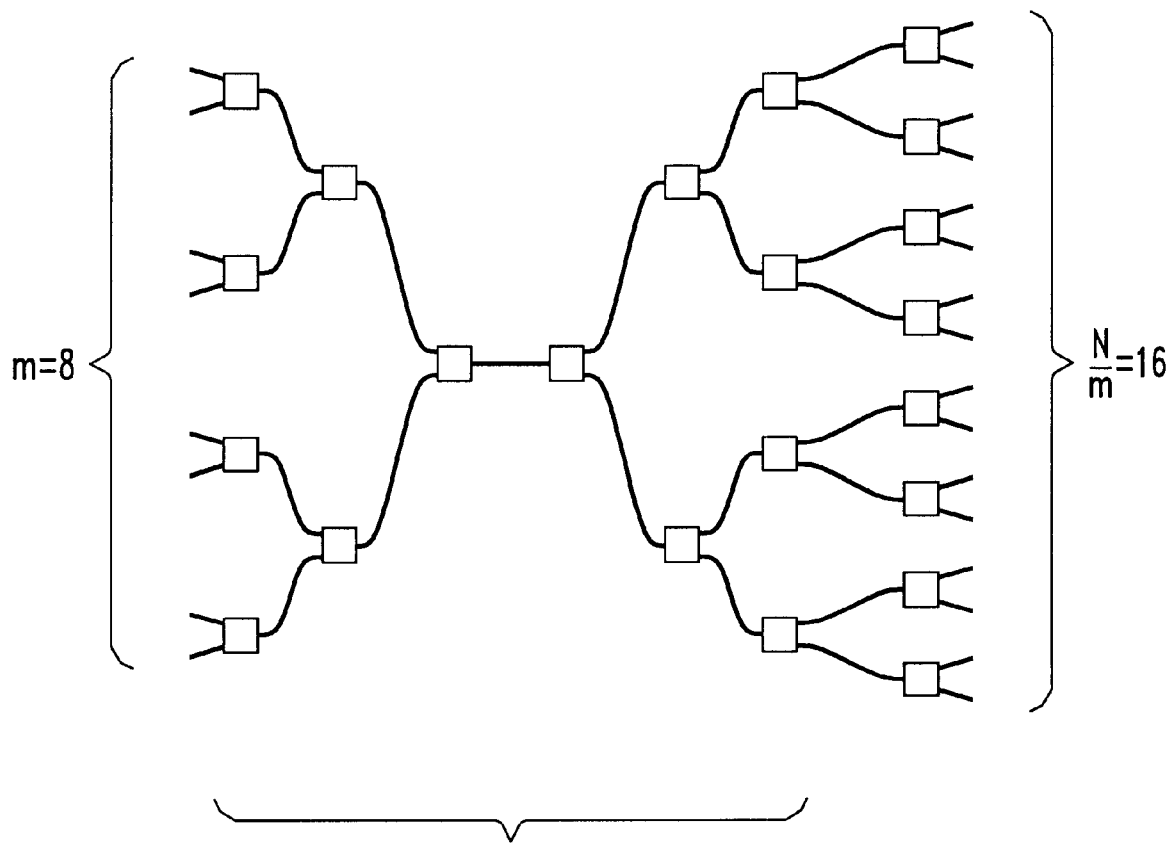
FIG. 4 shows an arrangement obtained for m=8, N/m=16 by joining together two trees of the second and third level. The first part of the arrangement is a symmetric m×m arrangement of two trees that can be replaced by an equivalent baseline arrangement of 2×2 elements.
Figure 4:
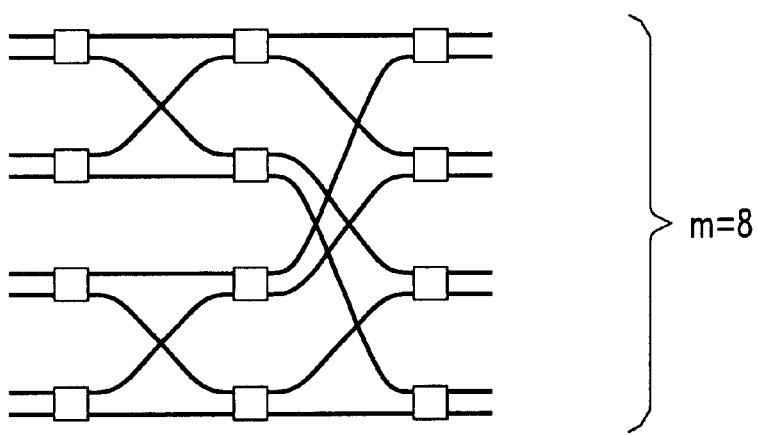

Note in FIG. 3*a*, that the m×1 tree together with a corresponding matching portion of the 1×n tree forms a symmetric m×m arrangement. This arrangement is only traversed by one signal, and therefore its depth can be substantially reduced by replacing it with an equivalent m×m arrangement of 2×2 elements as shown in FIGS. 3*b*, 4 for m=2,3,4,8 and n=N/M=4,6,8,16, respectively. With reference to FIG. 4, the new arrangement is known as a baseline arrangement, and it consists of log m columns of m/2 elements each. Therefore depth is reduced, by the new arrangement, from 2 log m to log m, and the number of elements is changed from 2(m−1) to m/2 log m. Where the depth is defined as the number of switch elements that a signal must traverse from an input to an output of the switch arrangement. The new arrangement is clearly advantageous if stringent requirements are placed on loss (depth). On the other hand, we have increased by a factor of m the number of interconnections between the two stages, and therefore the technique may not be advantageous if the total loss is not important. Note that for m>2 we have replaced by the above technique the entire m×m arrangement with a baseline arrangement of the same size. Clearly by using a smaller baseline arrangement, so as to only modify a central portion of the m×m arrangement, a smaller depth reduction will be realized, and a smaller increase in interconnections will be required. For instance, instead of the arrangement 313 we can simply use for m=4 the for 2×2 arrangement 311, thus obtaining a smaller reduction in depth or loss without too much of an increase in interconnections. Thus, depending upon the size of the switch and the relative importance of depth and interconnections, a variety of sizes may be used for the baseline arrangement. The same above considerations also apply to the junction of the last two stages, i.e., between the second and third stages of the switch arrangement.

Notice the arrangements considered here are fully dilated. That is no 1×2, 2×1, 2×2 switching element has more than one signal present. Without this condition, a 2×2 element traversed by two signals would add to each signal a small crosstalk component of magnitude X determined by the element extinction ratio. On the other hand, here each element will be traversed by at most one intended signal and, as a consequence, each crosstalk component will be of order two or more in X.

1. Crossbar Arrangements

Figure 5:
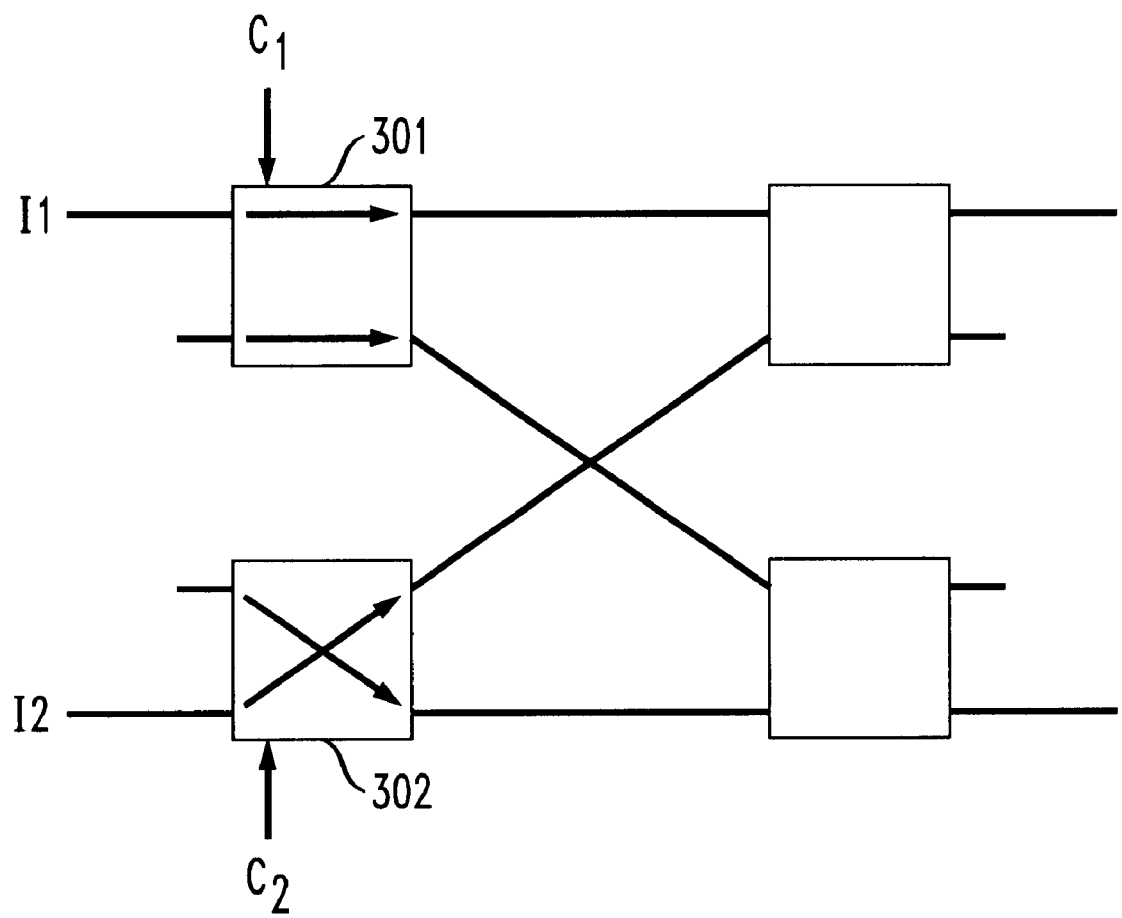
FIG. 5 shows a prior art 2×2 crossbar arrangement.
Figure 6:
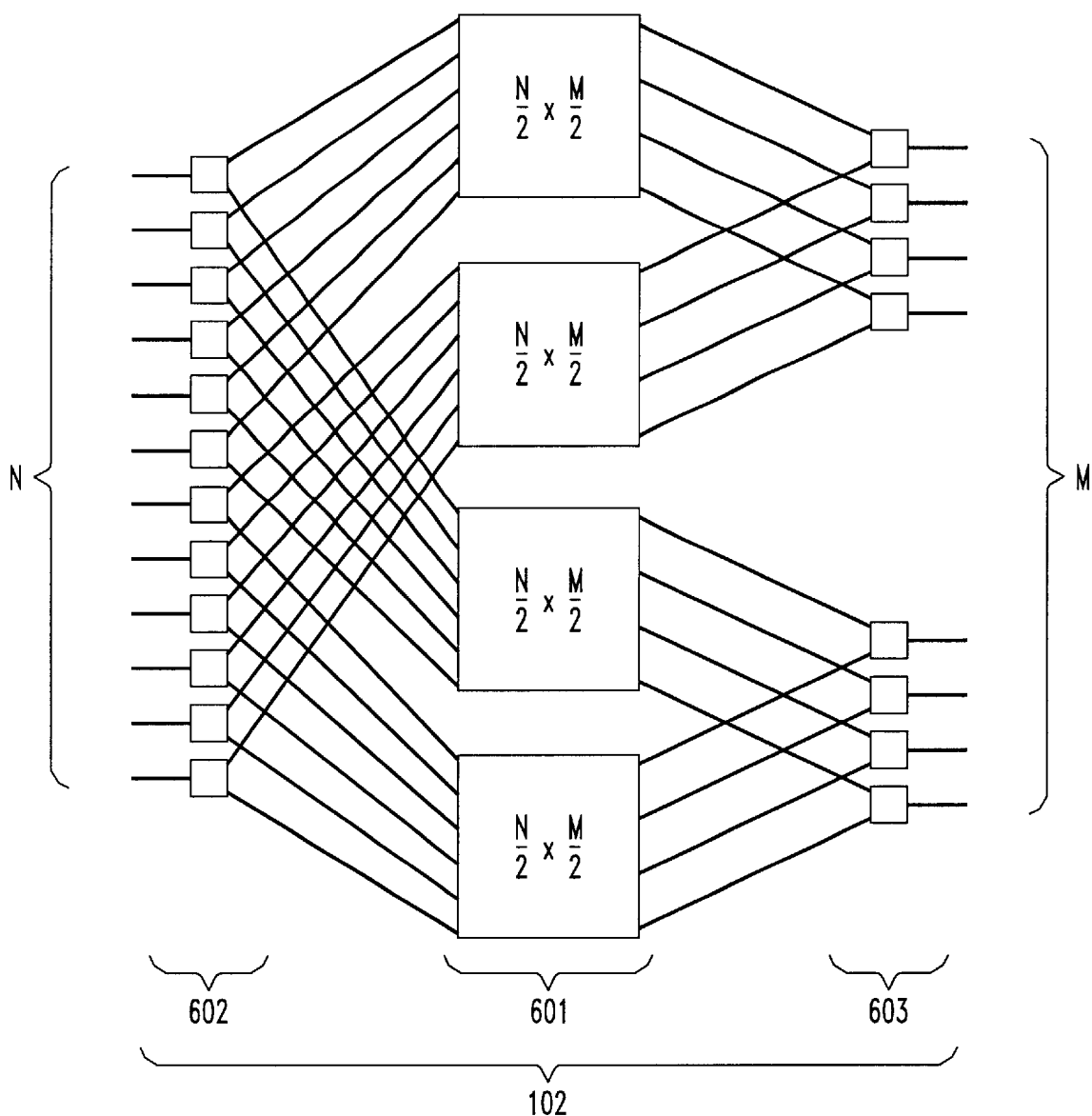
FIG. 6 shows an illustrative generalized representation of an N×M crossbar arrangement consisting of four central blocks combined with input and output 1×2 and 2×2 elements.

In the simplest case, a prior art symmetric crossbar arrangement with N=2 includes four elements as shown in FIG. 5. Each of the switch elements of FIG. 5, or the other figures of this application, can be set to one of its principal states, bar 301 or cross 302. Note the state of each of the 1×2 and 2×1 elements shown in FIG. 5, and other figures, are separately controlled by a control signal C applied thereto. Shown in FIG. 6 is a generalized arrangement for constructing a larger asymmetric N×M crossbar arrangements, where M>N. The arrangement of FIG. 6 can be used for a larger symmetric N×N crossbar arrangement by choosing N=M. In particular, one obtains for N=4 the arrangement of FIG. 7. This arrangement simply consists of two sets of binary trees, as shown by the three dimensional representation of FIG. 8. Similar arrangements are obtained in the asymmetric case N×M. Then the total number of elements is 2NM−N−M and the total depth is log N+log M , with each term rounded to the next largest integer. The above arrangements are attractive because of their minimum depth, and their low crosstalk as discussed later. On the other hand, an undesirable feature is the large number of elements for large N=M . Then the elements count must be reduced for large N by using Clos construction as shown in FIG. 1.

Figure 7:
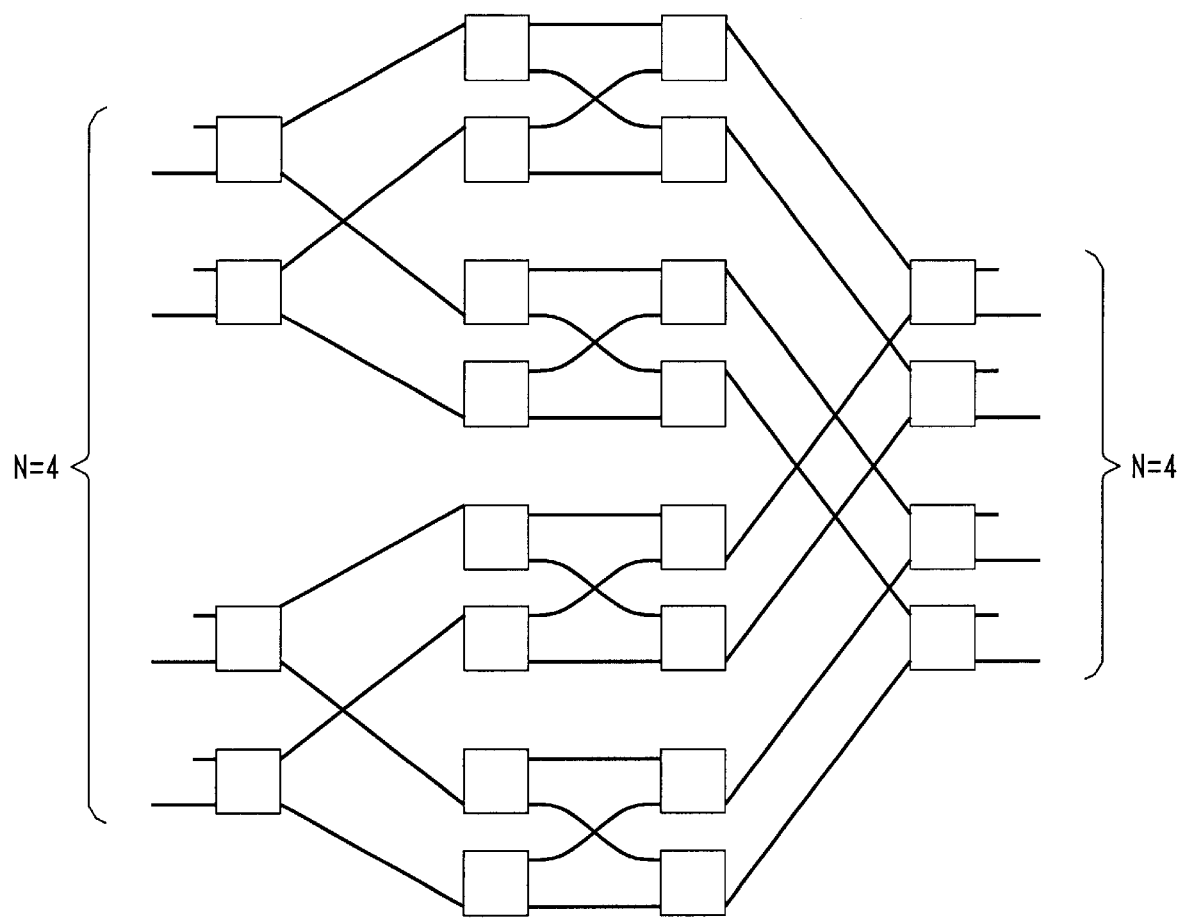
FIG. 7 shows an illustrative N×N crossbar arrangement for N=4.
Figure 8:
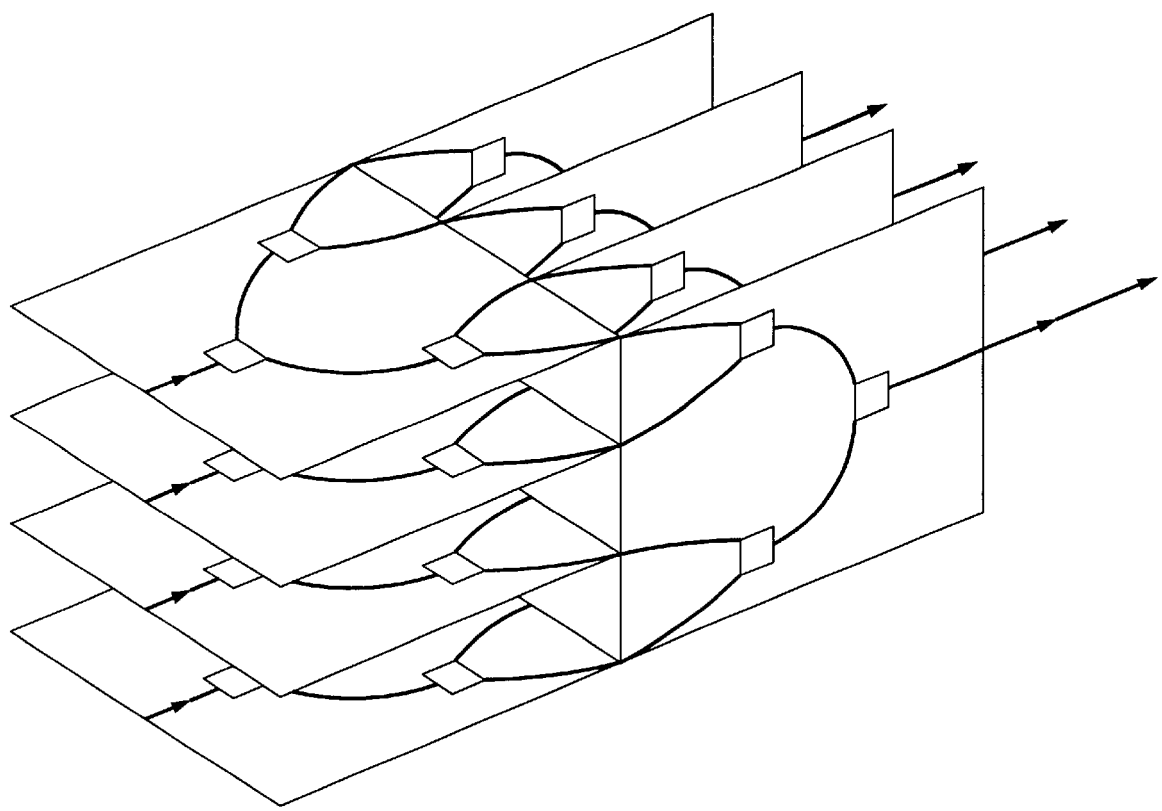
FIG. 8 shows a three dimensional representation of the 4×4 crossbar arrangement of FIG. 7.

Each building block of this arrangement can be realized by using a crossbar construction of binary trees as illustrated for instance in FIG. 8. In particular by using this construction for the input stage one finds that each m×(2m−1) input switch requires a total of Q=2m(2m−1)−3m+1 elements and a total depth of 2 log m+1, and the same result applies to each (2m−1)×m switch of the output stage. Often, one would like to realize each switch in integrated form on a wafer. It is then important to realize the m×(2m−1) and (2m−1)×m switches with minimum waveguide crossings, to simplify their fabrication in integrated form. I have discovered that this condition is realized for m=2 by the 2×3 arrangement of FIG. 9, which includes 7 elements with only one waveguide crossing 601. Moreover, by using combinations of the asymmetric switches, FIG. 9, and symmetric switches, FIG. 7, one can realize switches of larger m.

2. Generalized Clos Arrangement

Clos construction of FIG. 1 requires $$\frac{N}{m} \times \frac{N}{m}$$

blocks in the central stage and (2m−1)×m blocks in the other two stages. Therefore if Q is the number of elements of each (2m−1)×m, we obtain the recurrence $$P_N = (2m-1)P_{N/m} + 2\frac{N}{m}Q \quad (1)$$

Since the arrangement is symmetric, the output stage is the mirror image of the input stage, and we only need to consider the input stage. By using a crossbar arrangement of binary trees for each building block we find that $$P_{N/m} = 2\frac{N}{m}\left(\frac{N}{m} - 1\right)$$

and $$Q = 2m(2m-1) - 3m + 1,$$

giving $$P_N = (2m-1)N\left(2\frac{N}{m^2} + 4\frac{m-1}{m}\right) - 2N,$$

$$D_N \times 2(\log N + \log m + 1)$$

respectively giving the element count and depth for the complete arrangement.

Figure 2B:
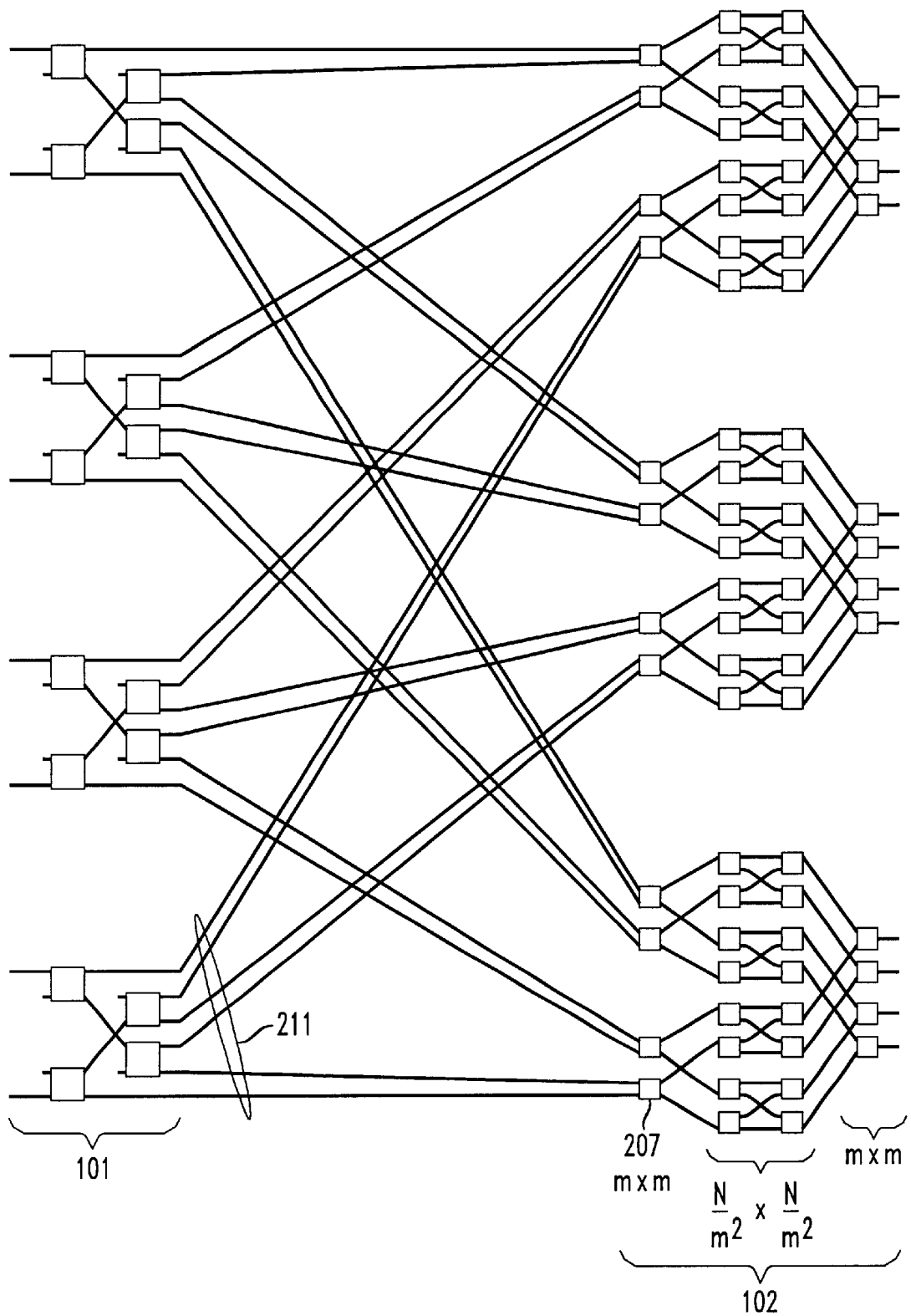

We next join together the three stages and obtain six levels of trees formed by 1×2 or 2×1 switching elements. With reference to FIG. 3a, the first and second levels form the first stage 301, and they are respectively made up of 1×m and (2m−1)×1 trees. The third and fourth levels form the second stage 305, and they are made up of 1×n and n×1 trees with n=N/m. Similarly, the last stage is simply the mirror image of the first. As pointed out earlier, an important property of this arrangement is that the first and second stage are joined together by directly connecting together the roots of the trees on either side of the junction 305. Thus each pair of trees connected together at the junction 305 forms a symmetric m×m arrangement consisting of the m×1 output tree 308 of stage two combined with the initial 1×m part of the 1×n input tree 309 of stage three. This arrangement is only traversed by one signal, and therefore its depth can be reduced by using an equivalent arrangement of 2×2 elements as shown in FIG. 4. The new arrangement is known as a baseline network. It is equivalent to the original arrangement, since an input signal can be transferred to any output port, by properly choosing the settings of the 2×2 elements. Its main advantage is its minimum depth. Indeed, as compared to the original arrangement, depth is reduced from 2 log m to log m and the number of elements is changed from 2(m−1) to m/2 log m. The new arrangement is clearly advantageous if stringent requirements are placed on loss (depth). On the other hand, we have increased by a factor of m the number of interconnections between the two stages. For instance, for m=2, each connection 210 from a building block of stage 101 in FIG. 2a is replaced by two connections 211, as shown in FIG. 2b. Therefore the technique may not be advantageous if the total loss is not important. The same considerations apply to the junction of the last two stages. The final result, by using the above technique, is that the element count and depth for the complete arrangement are now reduced to $$P_N = (2m-1)N\left(2\frac{N}{m^2} + \log m\right) - 2N,$$

$$D_N \times 2(\log N + 1)$$

and the depth $D_N$ is now close to the minimum value 2 log N for a dilated arrangement. We next minimize the element count by properly choosing m and obtain for N=64,128

$P_N$=4352,13184, $D_N$=14,16, for m=4,8

The element count is now substantially reduced, as compared to the values 8064,32512 that would be required by using a single crossbar arrangement of $2(N^2-N)$ elements as in FIGS. 7,8. The new values are reasonably close to the minimum values, which can be shown to be close to 3600,11000, for a fully dilated arrangement. Depth and crosstalk are also close to the minimum values. By optimizing the control algorithm, one can show that each block essentially contributes (to each signal) one crosstalk component of order two.

Figure 11:
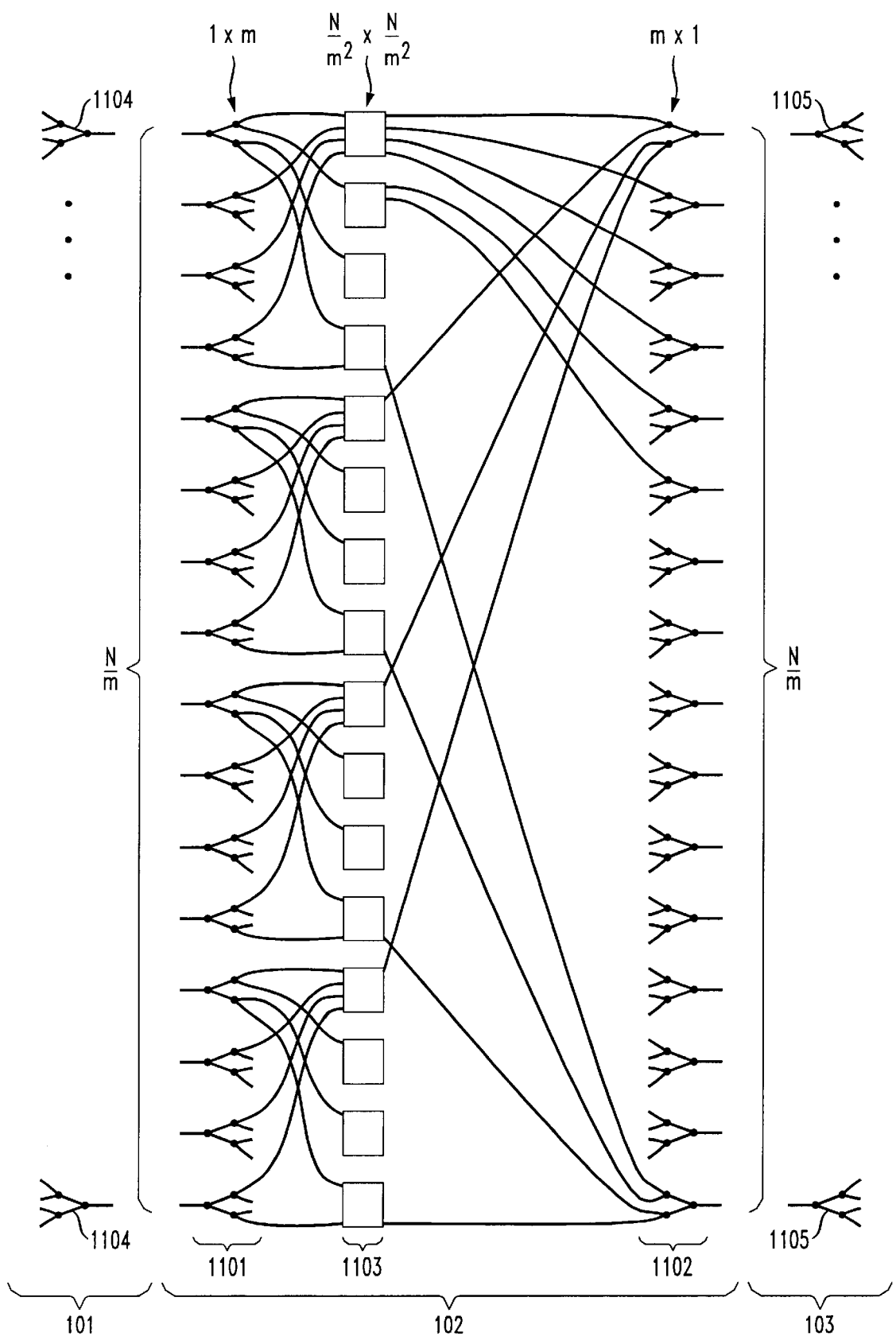
FIG. 11 shows a nonblocking $$\frac{N}{m} \times \frac{N}{m}$$

The present arrangements can now be generalized as follows. An N×N crossbar arrangement can be decomposed according to FIG. 6 for N=M into an arrangement consisting of a central unit 601 including four N/2×N/2 central blocks combined with input 602 and output 603 binary trees. Clearly a similar decomposition can be carried out again for each block of the central unit 601, and one can verify that repeated application of this decomposition to an N×N arrangement will produce, after s applications, a central stage arrangement consisting of input and output binary trees connected to $$\frac{N}{r} \times \frac{N}{r}$$

blocks with $r=2^s$. As shown in FIG. 11, this procedure may be applied to an $$\frac{N}{m} \times \frac{N}{m}$$

arrangement and we then obtain for r=m an arrangement of $$\frac{N}{m^2} \times \frac{N}{m^2}$$

blocks. This procedure clearly applies to each central block 106 in FIG. 1. Notice that the central block 106 is decomposed into input 1101 and output 1102 stages, consisting respectively of 1×m and m×1 trees, and central stage 1103 which includes a total of $m^2$ central blocks. Next we combine each 1×m tree 1101 of the central block 106 with a matching m×1 tree 1104 of the second tree level of input stage 101 so as to form a symmetric m×m arrangement. Similarly, we apply the same procedure to each m×1 tree 1102 of the central block input tree with a matching 1×m tree 1105 of the second tree level of output stage 103 so as to form a symmetric m×m arrangement. If for example m=4, then the 1×m trees are 1×4 trees and the m×1 trees are 4×1 trees and, as shown by 313 of FIG. 3b, combining a 1×4 tree with a 4×1 tree produces a 4×4 element. The final result is the N×N arrangement of FIG. 12. Note that not all of the connections have been shown for the inputs 1201, nor between the first 1202 and second 1203 stages, nor between the second 1203 and third 1204 stages, nor for the outputs 1205. In the generalized case, the first stage is constructed using m×m switches, the second stage using $$\frac{N}{m^2} \times \frac{N}{m^2}$$

blocks, and the output stage using m×m switches. The arrangement of FIG. 12 is clearly blocking, since each m×m can support only one path. On the other hand, a property of this arrangement is that each m×m switch of the input stage can be connected to each m×m switch of the output stage via a particular $$\frac{N}{m^2} \times \frac{N}{m^2}$$

block. Because of this property, a nonblocking N×N switch is obtained by combining a number p≧2m−1 of such N×N arrangements as shown in FIG. 13. The final arrangement consists of p central layers 1301 combined with input 1302 and output 1303 stages of 1×p and p×1 binary trees. We have derived this arrangement assuming that each building block in FIG. 1 is realized using a crossbar arrangement. However this condition need not be satisfied in FIGS. 12 and 13. In particular, each $$\frac{N}{m^2} \times \frac{N}{m^2}$$

need not be a crossbar arrangement. Moreover, each m×m need not be realized by using a combination of two trees, with a single link between the two trees (as shown in FIGS. 3b and 4). In particular, by increasing the number of links, minimum depth is obtained by using a baseline arrangement of 2×2 elements. More generally, instead of the above two designs, an intermediate design can be used for each m×m arrangement. The important common feature of the above N×N arrangements is their low values of loss (depth) and crosstalk realized with a substantial reduction in number of elements, as compared to the classical crossbar arrangement of FIG. 10.

Notice, in the special case where each m×m block in FIG. 12 consists of a m×1 binary tree of 2×1 elements connected to a 1×m binary tree of 1×2, and where each $$\frac{N}{m^2} \times \frac{N}{m^2}$$

switch is a crossbar arrangement of binary trees of 1×2, 2×1 elements, the complete arrangement of FIG. 13 is exactly equivalent to the arrangement obtained form FIG. 1 by using for each building block a crossbar arrangement of binary trees. In this case, therefore, the arrangement effectively includes a total of six levels of binary trees, as pointed out earlier.

So far we assumed 2m−1 layers in FIG. 13, because this can be shown to be the minimum number of layers required in order for the arrangement of FIG. 13 to be nonblocking in the wide sense. However, a larger number p may be desirable in general for redundancy, to increase reliability. As pointed out earlier, in order for the arrangement to be nonblocking each $$\frac{N}{m^2} \times \frac{N}{m^2}$$

in FIG. 13 must be nonblocking. An advantage of the above arrangement, which was derived assuming FIG. 6, is its modular construction involving p identical layers.

We conclude this section with one example. In the above N×N arrangements we have minimized depth by using 2×2 elements in each m×m switch. However, this technique increases (doubles, for m=2) the number of links between consecutive stages, as can be seen from FIGS. 2a and 2b. In the following example, we assume a large N, and we prefer to minimize the number of fiber connections between stages. Therefore we do not use the above technique. We also increase the number of central blocks from p=2m−1 to p=2m, to guarantee that at least two alternative paths are always available, for each connection between two ports, thus increasing redundancy. Then for N=128 and m=8 the arrangement includes thirty-two 8×16 input switches followed by sixteen 16×16 central switches. The total number of elements is now 15104 as compared to 13664 required previously. The total number of 16×16 fiber connectors on either side of the central stage is 16. The total depth is 22, corresponding to a loss of less than 5 dB assuming less than 0.2 dB per column. Additional losses are caused by the various connections. Each switch requires one connection. By including the input and output fiber connections, we obtain a total of 7 connections. Then assuming less than 0.5 dB per connection, the total loss is less than 8.5 dB.

By using the simple algorithm described next, the total number of crosstalk components (of order two, for a particular output port in the worse case) is 3 instead of 1 produced by the crossbar arrangement. In the above example, the depth is 2 log N+log m+1 instead of 2 log N, and the width is $$\frac{2m-1}{m^2} N^2$$

instead of $N^2$. The depth is the number of columns of switching elements from front to back, that is, from inlets to outlets, shown as D in FIG. 1. The width is the number of switching elements from top to bottom for the central stage, and it is shown as W in FIG. 2a.

As pointed out earlier it may be desirable to construct a m×(2m−1) switch with minimum waveguide crossings. To this purpose it is convenient to use the construction of FIG. 14a. By using recursively this construction, the m×(2m−1) arrangement can be realized as a combination of symmetric blocks and asymmetric 2×3 blocks. In each case, by using combinations of the 2×2 building block of FIG. 5, the 2×3 building block of FIG. 9, and the 4×4 building block of FIG. 7 minimizes waveguide crossings.

Crosstalk

Figure 10:
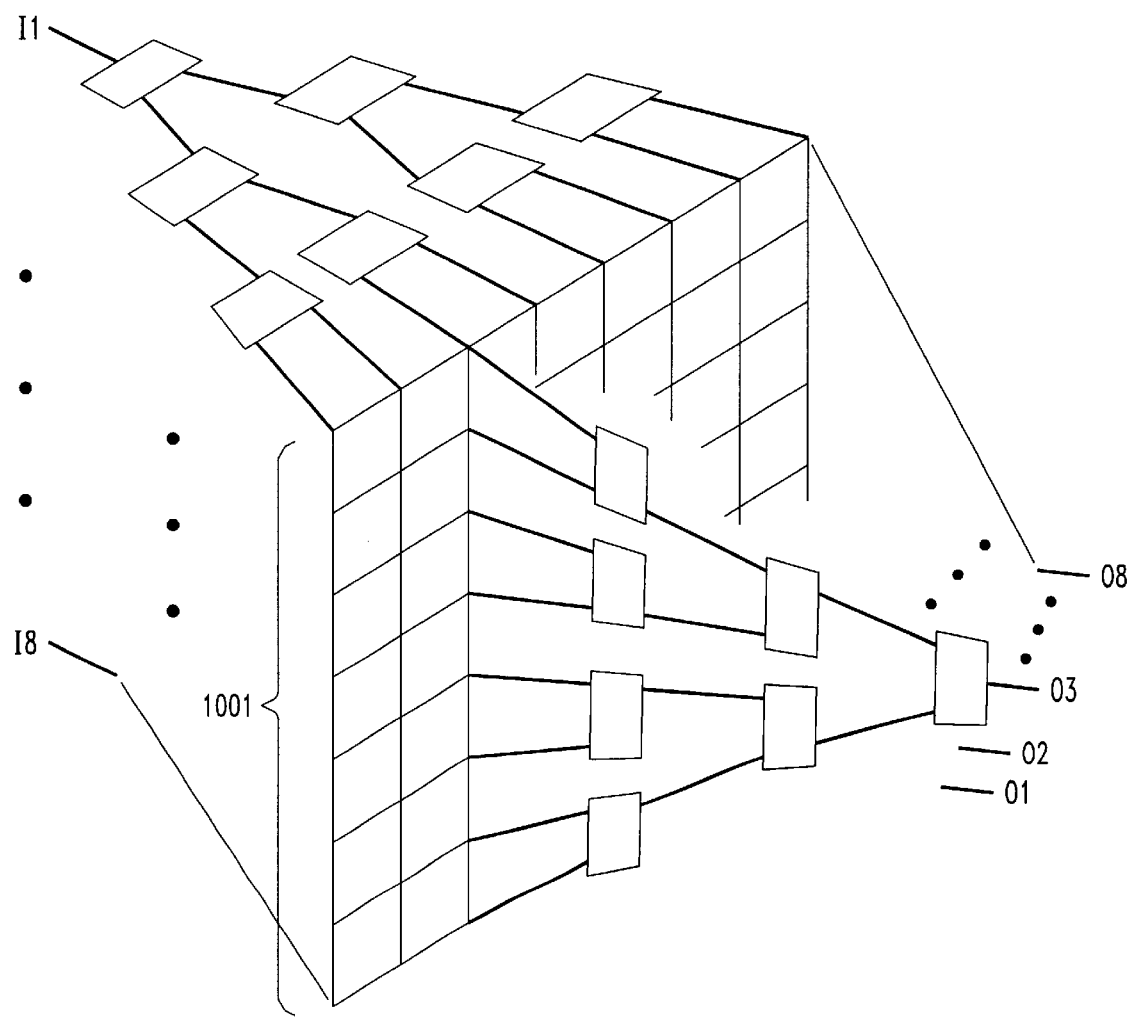
FIG. 10 shows a block diagram of a classical crossbar arrangement.

Shown in FIG. 10 is a diagram of an illustrative prior art 8×8 crossbar arrangement where only input 11 and output O3 are shown, the other inputs and outputs being similarly constructed. A generalized N×N crossbar arrangement would have N rows and N columns in the square array or matrix 1001. We minimize crosstalk in the crossbar arrangement of FIG. 10. This arrangement is fully dilated and therefore each crosstalk path includes at least two blocking elements whose transmission coefficients are approximately zero. As a consequence, since the "order" of each crosstalk component is determined by the number of blocking elements, the order is at least two. In particular for N=2, the arrangement of FIG. 10 reduces to that shown in FIG. 5, which is characterized by only one crosstalk component for each output port. The same result is obtained in FIG. 7 for N=4 by using a simple algorithm, shown below. More generally, for large N, the probability of a particular port receiving a crosstalk component of order 2 will be shown to be asymptotically zero. The above arrangement also features minimum depth and, because of the above properties, it is the optimum arrangement for many applications.

An N×N crossbar arrangement (of the FIG. 10 type) is characterized by a total of $N^2$ paths that determine on the central plane a square array of $N^2$ points. Each row corresponds to a particular input port and each column to a particular output port. If all input signals are active, the arrangement is exactly characterized by N active paths and $N^2-N$ idle paths. Each idle path contributes a crosstalk component. Its path goes from a particular element of an active path to a particular element of a different active path. Since transmission is blocked at both ends of the idle path, the order of crosstalk is at least two. The order is defined here as the total number of nonblocking elements that are approximately characterized by zero transmission for the idle path. Notice that each output port receives exactly N−1 crosstalk components, each produced by a particular input signal and a particular idle path. However, some idle paths include more than two elements and therefore we expect some of these to be of order higher than two. Indeed as shown below, by using a simple algorithm at most one of the above N−1 components will be of order 2.

Notice that all idle paths with only two elements are necessarily of order two. We denote them α. Here we are only concerned with the remaining idle paths, which we denote γ. Our objective is to cause as many of these to be of order higher than two, by blocking them with at least one intermediate element. Notice the elements adjacent to the central plane are arranged in groups of four forming 2×2 blocks. By also including the elements adjacent to the 2×2 blocks we obtain 4×4 blocks as in FIG. 7. The algorithm only involves these blocks.

First consider the central stage consisting of 2×2 switches. Each switch is made up of four elements and four paths as in FIGS. 5 and 10. Two elements are on one side of the central plane and, the other two, on the other side. Thus the four paths form an array of four points on the plane. Here, if both inputs are idle, we block each path with one of the four elements. This can be done in two ways that are equivalent for our purpose here. In the other case, if at least one input path I1, I2 is active, the switch is set to one of its principal states, bar or cross. Then two paths are blocked and the other two are not. In this case if both inputs are active, the result is two idle paths of order two, which is denoted α. On the other hand, if only one input is active, three idle paths are obtained. Two of these are blocked, they are of order higher than two, whereas the other path is idle but unblocked, which is denoted γ. Now the total number of paths that are either α or γ is exactly equal to the number N of active paths. It is therefore conclude that the total number of paths of order 2 is no greater than N. One can also verify that the above paths α, γ have the important property that each row in the central plane only contains one of them, and the same is true for each column. Therefore the N paths are disjoint. Each input signal contributes one of them, and each output port receives one of them.

Next consider a path γ, whose order is yet to be determined. This path passes through a particular 4×4 block, and it includes the input and output elements of that 4×4 block. In order for the path to be of order higher than 2, it must include at least 5 elements. If this condition is satisfied, then one of above elements is an intermediate idle element, and by blocking the path with this element the order becomes at least 3. Since the paths γ are all disjoint, this procedure can be applied to all of them without conflicts, and the final result is that all paths γ with more than 4 elements become of order higher than 2. Notice that for N=4 all idle paths include at most 4 elements. In this case none of the γ paths can be blocked and the number of paths of order 2 is exactly N. On the other hand, for large N one finds that the probability of a particular output port receiving a crosstalk component of order 2 is $$\frac{1}{N-1} + \left(\frac{2}{N-2}\right)^2$$

where the first term is the probability $1/(N-1)$ of an additional signal passing through the particular 2×2 block that is used by the output signal in question.

An important conclusion is that crosstalk, for the classical crossbar arrangement, is approximately independent of N. It is entirely generated, to a first order approximation, by the central blocks and, therefore, a large extinction ratio is only required for these blocks.

APPENDIX

References

[1] Alfemess, R. C., "Guided-wave Devices for Optical Communications," IEEE J. Quantum Electron., Vol. QE-17, pp. 946–957, 1981.

[2] Padmanabhan, K., and Netravali, A., "Dilated Networks for Photonic Switching," IEEE Transactions on Communications, Vol. COM-35, No. 12, pp. 1357–1365, December 1987.

[3] Ramaswami, R. and Sivarajan, K. N., "Optical Networks: A Practical Perspective," San Francisco, Calif.; Morgan Kaufmann, 1998.

[4] Benes, V. E. and Kurshan, R. P., "Wide-Sense Nonblocking Network Made of Square Switches", Electronic Letters, Vol. 17, No 19, p.697, September 1981,

[5] Spanke, R. A., "Architectures for Guided-wave Optical loptical Space Switching Systems," IEEE Communications Magazine, 25 (5), pp. 42–48, May 1987.

[6] Nishi, T., Yamamoto, T., and Kuroyanagi, S., "A Polarization-Controlled Free-Space Photonic Switch Based on a PI-Loss Switch," IEEE Photon. Technol. Lett., Vol. 6, No. 9, pp. 1104–1106, September 1993.

[7] Kondo, M., Takado, N, Komatsu, K., and Ohta, Y., "32 Switch Elements Integrated Low Crosstalk LiNbO3 4×4 Optical Matrix Switch," IOOC-ECOC 85, Venice, pp. 361–364, 1985.

[8] Goh, T., Himeno, A., Okuno, M., Takahashi, H., and Hattori, K., "High-Extinction Ratio and Low Loss Silica-Based 8×8 Thermooptic Matrix Switch," IEEE Photon. Technol. Lett., Vol. 10, No. 3, pp. 358–360, March 1998.

[9] Hamamoto, H., Anan, T., Komatsu, K., Sugimoto, M., and Mito, I., "First 8×8 Semiconductor Optical Matrix Switches Using GaAs/AlGaAs Electro-optic Guided-wave Directional Couplers," Electron. Lett., vol. 28, pp. 441–443, 1992.

[10] Granestrand, P., Lagerstrom, B., Svensson, P., Olofsson, H., Falk, J. E., and Stoltz, B., "Pigtailed Tree-structured 8×8 LiNbO$_3$ Switch Matrix with 112 Digital Optical Switches," IEEE Photon. Technol. Lett., Vol. 6, pp. 71–73, 1994.

[11] Murphy, E. J., Murphy, T. O., Ambrose, A. F., Irvin, R. W., Lee, B. H., Peng, P., Richards, G. W., and Yorinks, A., "16×16 Strictly Nonblocking Guided-wave Optical Switching System," J/Lightwave Technol., Vol. 10, pp. 810–812, 1998.

What is claimed is:

1. An N×N nonblocking optical switch for providing a connection between any of N inlets and any of N outlets, where N is an integer, the N×N switch comprising an integer number p of layers, each formed by a distinct N×N arrangement;

an integer number N of 1×p input space switches, each input of each of the N input space switches connects to a different one of the N inlets, and each input space switch connects to all layers;

an integer number N of p×1 output space switches, each output of each of the N output space switches connects to a different one of the N outlets, and each output space switch connects to all layers;

each layer consists of three stages, the first and third of which consist of m×m switches and the second stage consists of $$\frac{N}{m^2} \times \frac{N}{m^2}$$

nonblocking switches;

each m×m switch is capable of forming at least one path from any of its m input ports to any of its m output ports, and each m×m of the first stage is connected to each m×m switch of the third stage via one particular switch of the second stage; and the number p of layers satisfies $p \geq 2m-1$.

2. The N×N switch of claim 1 wherein each m×m switch consists of a m×1 binary tree of 2×1 elements connected to a 1×m binary tree of 1×2 elements.

3. The N×N switch of claim 1 wherein each m×m switch includes m/2 log m of 2×2 elements arranged in log m columns of m/2 elements each.

4. The N×N switch of claim 1 wherein each $$\frac{N}{m^2} \times \frac{N}{m^2}$$

switch is a crossbar arrangement of binary trees of 1×2, 2×1 elements.

5. The N×N switch of claim 1 wherein the each m×m switch consists of a m×1 binary tree of 2×1 elements connected to a 1×m binary tree of 1×2 and wherein each $$\frac{N}{m^2} \times \frac{N}{m^2}$$

switch is a crossbar arrangement of binary trees of 1×2, 2×1 elements.

6. The N×N switch of claim 1 wherein each m×m switch and each $$\frac{N}{m^2} \times \frac{N}{m^2}$$

switch is a crossbar arrangement of two levels of binary trees of 2×1 and 1×2 elements, and the complete arrangement includes a total of six levels of binary trees where the first and second levels form a first stage of m×p switches, the third and fourth levels form a second stage of $$\frac{N}{m} \times \frac{M}{m}$$

switches, and the fifth and sixth levels form a third stage of the p×m switches.

7. An N×N nonblocking optical switch for providing a connection between any of N inlets and any of N outlets, where N is an integer, the N×N switch comprising three stages respectively including m×p, $$\frac{N}{m} \times \frac{M}{m}$$

and p×m switches, where m is an integer divisor of N and p is an integer satisfying $p \geq 2m-1$;

each stage including two levels of trees formed by 1×2 or 2×1 elements;

the N×N switch comprising a total of six levels of trees;

each even level of trees being formed by 1×2 elements, so that each tree has one input port, which is formed by the 1×2 element at the root of the tree, and it has many output ports formed by the 1×2 elements corresponding to leaves of the tree;

each odd level of trees being formed by 2×1 elements, so that each trees has one output port corresponding to the root and many input ports corresponding to leaves of the tree;

the input stage including m×p switches including a first level and a second level of binary trees, each tree of the first level having its input port connected to a different one of the N inlets and having each output port connected to a different tree of the second level of trees, each output port of the second level of trees being connected to a different tree of the center stage;

the center stage including $$\frac{N}{m} \times \frac{M}{m}$$

switches, including the third and fourth level of binary trees, each tree of the third level having each output port connected to a different tree of the fourth level of trees, each output port of the fourth level of trees being connected to a different tree of the output stage; and the output stage including p×m switches including the fifth and sixth level of binary trees, each tree of the fifth level having each output port connected to a different tree of the sixth level of trees, each output port of the sixth level of trees being connected to a different one of the N outlets.

8. The N×N switch of claim 7 wherein
the input stage includes a plurality of 2×3 switching blocks, each characterized by one waveguide crossings.

9. The N×N switch of claim 7 wherein
the output stage includes a plurality of 3×2 switching blocks, each characterized by one waveguide crossing.

10. The N×N switch of claim 7 wherein
at the connection junction between both the input stage and the center stage and the center stage and the output stage, each combination of a 2×1 switch directly connected to a 1×2 switch at the connection junction is replaced with a 2×2 switch.

11. The N×N switch of claim 7 wherein $m \geq 4$ and
at the connection junction between both the input stage and the center stage and the center stage and the output stage, each combination of a 4×1 switch directly connected to a 1×4 switch is replaced with a 4×4 switch consisting of two columns of 2×2 switches.

12. The N×N switch of claim 7 wherein $m \geq 3$ and
at the connection junction between both the input stage and the center stage and the center stage and the output stage, each combination of a 3×1 switch directly connected to a 1×3 switch is replaced with a 3×3 switch consisting of two columns of switching elements.

13. The N×N switch of claim 7 wherein
the input stage includes a plurality, N/m, of m×p input switches, each input of each of the m×p input switches connects to a different one of the N inlets, where m is an integer divisor of N and p is an integer satisfying $p \geq 2m-1$;

the output stage includes a plurality, N/m, of p×m output switches, each output of each of the p×m output switches connects to a different one of the N outlets; and the center stage includes a plurality, p, of N/m×N/m central switches, wherein the N/m inputs of each N/m×N/m central switch are connected to different m×p input switches, and the N/m outputs of each N/m×N/m central switch are connected to different p×m output switches.

14. The N×N switch of claim 7 wherein the switch depth is 2 log N+log m+1.

15. The N×N switch of claim 7 wherein the switch width is $$\frac{2m-1}{m^2}N^2.$$

* * * * *